United States Patent Office 3,318,897
Patented May 9, 1967

3,318,897
NOVEL METHOD FOR PREPARING YOHIMBINONE
Jay Donald Albright and Leon Goldman, Nanuet, N.Y., assignors to American Cyanamid Company, Stamford, Conn., a corporation of Maine
No Drawing. Filed May 1, 1964, Ser. No. 364,324
2 Claims. (Cl. 260—287)

This invention relates to a novel method of converting yohimbine or β-yohimbine to yohimbinone.

In general, oxidation of the 17-hydroxyl group of the yohimbine molecule to a 17-keto group has proved difficult because of the extreme sensitivity of the indole moiety to oxidative conditions. In the past, the conversion has been achieved with limited success by means of the Oppenauer oxidation. Alternately, the Kornblum oxidation has been used, a procedure by which the 17-hydroxyl group is first converted into the O-p-toluenesulfonate or O-p-bromobenzenesulfonate and the intermediate O-sulfonate is then heated with a base such as triethylamine in dimethylsulfoxide. The latter method is limited in feasibility because of said reactions. The novel method of this invention for preparing yohimbinone has particular application in preparing yohimban-17-one, a valuable yohimbe alkaloid intermediate.

We have now discovered a highly selective and mild oxidation technique whereby yohimbine or β-yohimbine may be readily converted to yohimbinone in excellent yields. In accordance with the present invention, yohimbine or β-yohimbine is converted to yohimbinone by treatment with anhydrous dimethylsulfoxide and a carbodiimide in the presence of an acid catalyst. This reaction is illustrated schematically below:

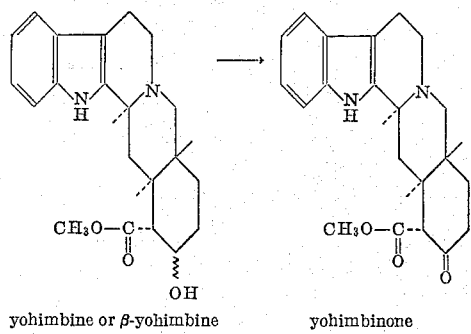

yohimbine or β-yohimbine            yohimbinone

At least one mole equivalent of dimethylsulfoxide is preferably employed but best results are obtained when an excess of dimethylsulfoxide is employed as solvent. However, the anhydrous dimethylsulfoxide may be diluted to the extent of 90% with an anhydrous inert solvent such as benzene, toluene, tetrahydrofuran, dioxane, or the like.

At least one mole equivalent of a carbodiimide is preferably employed but best results are obtained when from 2 to 5 mole equivalents of a carbodiimide are employed. The particular carbodiimide employed is not critical and suitable carbodiimides are, for example, N,N'-diisopropylcarbodiimide, N,N'-di-t-butylcarbodiimide, N,N'-dicyclohexylcarbodiimide, N,N'-di-p-tolylcarbodiimide, etc.

Acid catalysts such as orthophosphoric acid, phosphoric acid, phosphorous acid, cyanoacetic acid, and the pyridinium or tri(lower alkyl)ammonium salts thereof promote rapid oxidation within a few hours at room temperature. Stronger acids such as trichloroacetic acid and trifluoroacetic acid serve only poorly and mineral acids such as hydrochloric acid and sulfuric acid lead to no oxidation. However, these latter strong acids do function well as their pyridinium or tri(lower alkyl)ammonium salts. Suitable tri(lower alkyl)ammonium salts are those having from 1 to 3 carbon atoms. Although from 0.1 to 2.0 mole equivalents of acid catalyst may be used, best results are obtained when from about 0.5 to about 1.5 mole equivalents of acid catalyst are employed.

The conditions of the reaction are not especially critical. The reaction may be carried out at temperatures ranging from about 0° C. to about 100° C. with room temperature being preferred and convenient. The period of time required may vary from a few hours to 20 hours or more. The yohimbinone is isolated from the reaction mixture in a conventional manner and may be purified by recrystallization from methanol-ether in a standard manner.

The invention will be described in greater detail in conjunction with the following specific examples.

EXAMPLE 1

Preparation of yohimbinone

To a solution of 28.32 g. (0.080 mole) of yohimbine, 49.04 g. (0.24 mole) of dicyclohexylcarbodiimide in 120 ml. of dry dimethyl sulfoxide was added 12.0 g. (0.12 mole) of crystalline orthophosphoric acid. On agitation of the reaction mixture by shaking, heat was liberated. The mixture was allowed to stand at room temperature for 17 hours and poured into 350 ml. of methanol-water (60:40). After standing for 20 minutes the mixture was filtered. The solid was washed with two 100 ml. portions of methanol-water (60:40); 60 ml. of 50% aqueous acetic acid and 100 ml. of methanol. (Filtrate A): The solid was then washed with 200 ml. of 50% acetic acid, 100 ml. of 70% acetic acid, 100 ml. of water and 300 ml. of methanol. (Filtrate B): Filtrate B was diluted with water made basic with concentrated ammonium hydroxide and filtered to give, after drying, 13.15 g. (46.6%) of yohimbinone as yellow crystals, melting point 250–254° C. dec. The filtrate A was diluted with 200 ml. of water and made basic with concentrated ammonium hydroxide. Chilling and filtering (Filtrate C) give 10.0 g. of solid which was dissolved in methylene chloride (containing 1% methanol) and filtered through 40 g. of Florisil. Elution with methylene chloride (800 ml.) and concentration under reduced pressure gave (after trituration with methanol-ether) 7.65 g. (27.1%) of yohimbinone as yellow crystals, melting point 243–245° C. dec. The filtrate C was extracted with methylene chloride, the extracts were washed with water, dried over magnesium sulfate and concentrated under reduced pressure. The residue was dissolved in methylene chloride and filtered through Florisil (40 g.). Elution with methylene chloride, concentration of the eluate under reduced pressure and trituration of the residue with methanol-ether gave 1.0 g. (3.4%) of yohimbinone, melting point 244–246° C. dec. The total yield of yohimbinone was 21.8 g. (77.3%).

EXAMPLE 2

Preparation of yohimbinone

A mixture of 7.08 g. (0.020 mole) of yohimbine, 12.26 g. (0.060 mole) of dicyclohexylcarbodiimide, 1.61 g. (0.0165 mole) of crystalline orthophosphoric acid and 25 ml. of dry dimethyl sulfoxide was heated under nitrogen at 55–60° for 20 hours. The mixture was poured into a mixture of 50 ml. of methanol and 10 ml. of water. After standing at room temperature, the mixture was filtered and the precipitated N,N'-dicyclohexylurea washed with two 25-ml. portions of methanol and with 25 ml. of methanol containing 2 ml. of glacial acetic acid. The filtrate was made basic with concentrated ammonium hydroxide and the solid which separated was washed with two 25 ml. portions of methanol and with 25 ml. of ether to give 3.35 g. (47.6%) of yohimbinone as yellow crystals, M.P. 247–249° C. dec. The filtrate was concentrated under reduced pressure, diluted with 500 ml. of water and extracted with chloroform. The chloroform extracts was washed with water, dried over magnesium sulfate and concentrated under reduced pressure to a viscous mass. Addition of 25 ml. of methanol and 50 ml. of ether and chilling, gave 0.54 g. (7.7%) of yohimbinone. The total yield of yohimbinone was 55.3%.

EXAMPLE 3

*Preparation of yohimbinone*

A mixture of 14.16 g. (0.040 mole) of yohimbine, 24.52 g. of dicyclohexyylcarbodiimide, 3.92 g. (0.040 mole) of crystalline orthophosphoric acid and 60 ml. of dry dimethylsulfoxide was heated under nitrogen at 70–75° in an oil bath for 21 hours. The mixture was poured into 100 ml. of methanol and 20 ml. of water and after standing at room temperature for 20 minutes was filtered. The solid was washed with 50 ml. of methanol containing 5 ml. of glacial acetic acid and with two 50-ml. portions of methanol. The filtrate was made basic with concentrated ammonium hydroxide and the yellow solid which separated was filtered and washed with 30 ml. of methanol and three 50-ml. portions of ether. Drying gave 10.5 g. of yellow crystals which were heated with chloroform-methanol. The mixture was filtered from insoluble solid and the filtrate concentrated under reduced pressure. Trituration of the residue with methanol-ether gave 6.16 g. (43.7%) yohimbanone, M.P. 251–253° C. dec. From the mother liquors an additional 1.0 g. (7.1%) of product was obtained on concentration under reduced pressure. Concentration of the original mother liquors (from which the 10.5 g. of solid was obtained) under reduced pressure and dilution with 200 ml. of water gave 4.93 g. of solid which was dissolved in chloroform-methanol and treated with activated carbon. Concentration of the solution under reduced pressure and trituration of the residue with methanol-ether gave an additional 2.0 g. (14.2%) of yohimbinone. The total yield of yohimbinone was 65%.

EXAMPLE 4

*Preparation of yohimban-17-one from yohimbinone*

To a solution of 2.0 g. of yohimbinone in 15 ml. of 80% acetic acid was added 2.0 ml. of concentrated sulfuric acid. The mixture was refluxed for 3.5 hours and poured into a mixture of ice and concentrated ammonium hydroxide. Methanol was added and the mixture extracted with methylene dichloride and with chloroform. The combined extracts were dried over magnesium sulfate and concentrated under reduced pressure. The residue was triturated with methanol-ether to give 0.590 g. of yohimban-17-one as tan crystals, melting point 288–294° C. dec.

EXAMPLE 5

*Preparation of yohimban-17-one from yohimbinone*

A mixture of 2.1 g. of yohimbinone hydrochloride, 100 ml. of 3 N hydrochloric acid and 25 ml. of glacial acetic acid was refluxed for 4 hours. The mixture was cooled and poured into ice and 75 ml. of concentrated ammonium hydroxide. The mixture was filtered and the solid washed with water. The solid was dissolved in ethanol-methylene chloride and the solvent removed under reduced pressure. The residue was triturated with methanol to give 0.90 g. (56.5%) of yohimban-17-one as tan crystals, melting point 292–295° C. dec. Evaporation of the filtrate gave an additional 0.65 g. (40.8%) of yohimban-17-one as tan crystals, melting point 285–288° C. dec.

What is claimed is:

1. The method of preparing yohimbinone which comprises treating a compound selected from the group consisting of yohimbine and β-yohimbine with at least one mole equivalent of dimethylsulfoxide and at least one mole equivalent of a carbodiimide in the presence of at least 0.1 mole equivalent of an acid catalyst selected from the group consisting of phosphoric acid, phosphorous acid, cyanoacetic acid, the pyridinium salts thereof and the tri(lower alkyl)ammonium salts thereof at a temperature of from about 0° C. to about 100° C.

2. The method of preparing yohimbinone which comprises treating yohimbine with at least one mole equivalent of dimethylsulfoxide and at least one mole equivalent of N,N'-dicyclohexylcarbodiimide in the presence of at least 0.1 mole equivalent of orthophosphoric acid at a temperature of from about 0° C. to about 100° C.

References Cited by the Examiner

UNITED STATES PATENTS 3,093,648   6/1963   Robinson et al. _____ 260—287

OTHER REFERENCES

Pfitzner et al.: Jour. Amer. Chem. Soc., vol. 85 (Oct. 5, 1963), pp. 3027–8.

WALTER A. MODANCE, *Primary Examiner.*

JAMES A. PATTEN, *Assistant Examiner.*